United States Patent

Wood

[11] Patent Number: 5,697,723
[45] Date of Patent: Dec. 16, 1997

[54] JOINT ASSEMBLY

[75] Inventor: Ruey E. Wood, Harrison, Mich.

[73] Assignee: TRW Inc., Lyndhurst, Ohio

[21] Appl. No.: 571,165

[22] Filed: Dec. 12, 1995

[51] Int. Cl.$^6$ ............................................. F16C 11/08
[52] U.S. Cl. .......................... 403/135; 403/122; 403/143; 403/132
[58] Field of Search .................................. 403/122, 132, 403/133, 135, 137, 140, 141, 142, 143

[56] References Cited

U.S. PATENT DOCUMENTS

| | | |
|---|---|---|
| 2,488,979 | 11/1949 | Kogstrom . |
| 3,108,830 | 10/1963 | Fierstine ........................ 403/140 |
| 3,164,389 | 1/1965 | Thomas ........................ 403/140 X |
| 3,350,122 | 10/1967 | Ulderup ........................ 403/135 |
| 3,363,921 | 1/1968 | Gottschald ..................... 403/132 X |
| 4,070,123 | 1/1978 | Willingshofer et al. . |
| 4,231,673 | 11/1980 | Satoh et al. . |
| 5,154,530 | 10/1992 | Dresselhouse . |
| 5,395,176 | 3/1995 | Zivkovic ........................ 403/122 |

FOREIGN PATENT DOCUMENTS

| | | |
|---|---|---|
| 0342351 | 4/1989 | European Pat. Off. . |
| 0459644 | 12/1991 | European Pat. Off. . |
| 2432645 | 2/1980 | France . |
| 2405160 | 8/1975 | Germany . |
| 1067426 | 5/1967 | United Kingdom ............ 403/135 |
| 2106173 | 4/1983 | United Kingdom ............ 403/122 |
| 2265940 | 10/1993 | United Kingdom . |

*Primary Examiner*—Anthony Knight
*Assistant Examiner*—William L. Miller
*Attorney, Agent, or Firm*—Tarolli, Sundheim, Covell, Tummino & Szabo

[57] ABSTRACT

A ball joint (12) is disclosed comprising a stamped sheet metal socket (14) and a ball end (18). The socket (14) comprises a base portion (40) and a conical portion (38) above the base portion (40) integral with the base portion (40). A wear tolerance compensator (44) is seated against the base portion (40). A plastic spherical bearing (46) is contained within the socket (14) and seats against the wear tolerance compensator (44). The ball end (18) is contained by the spherical bearing (46). An annular metal collar (48) fits over the spherical bearing (46). The collar (48) comprises a tapered end (82) which seats in the socket conical portion (38). The socket (14) comprises an annular lip (32) which clamps the collar (48) and presses the collar tapered end (82) into sealing engagement with the conical portion (38), under a predetermined load, sealing the socket (14) against environmental ingress.

13 Claims, 1 Drawing Sheet

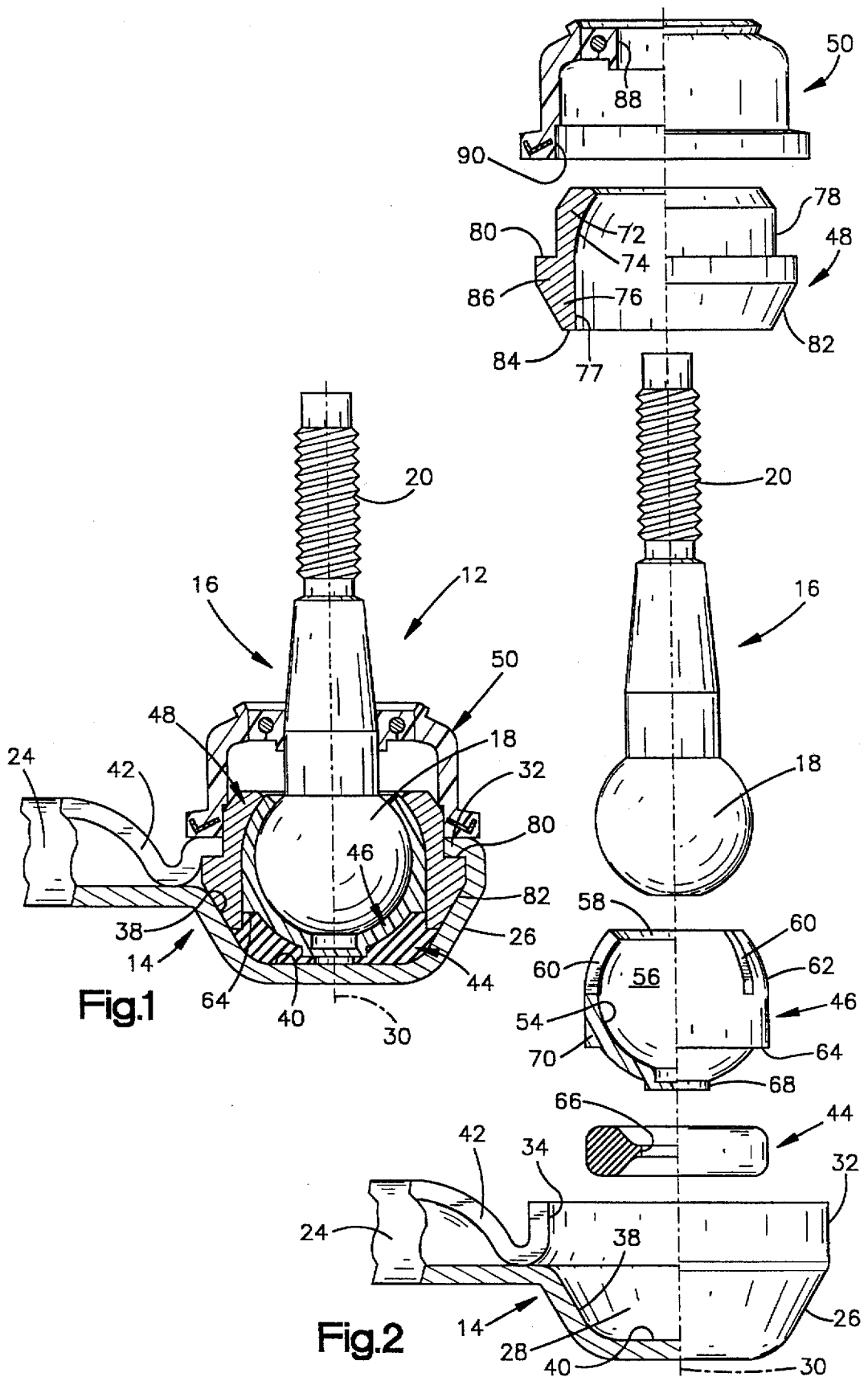

JOINT ASSEMBLY

BACKGROUND OF THE INVENTION

1. Technical Field

The present invention relates to a joint assembly. The joint assembly is particularly useful as a component of a vehicle suspension or a steering linkage.

2. Description of the Prior Art

Known ball joint assemblies having stamped sheet metal housings depend on the accuracy of the stampings to obtain a desired fit with other components of the joint assembly. The need for accurate stampings to form the sheet metal housings of known ball joint assemblies contributes to the cost of the known ball joint assemblies. After known ball joint assemblies have been used, they become worn and a ball stud may become axially movable relative to the housing.

SUMMARY OF THE INVENTION

An improved joint assembly includes a movable member having a head end portion which is enclosed by a metal housing. The metal housing includes a base section and a collar section. The base section has a tapered inner side surface. The collar section has a tapered outer side surface which is disposed in wedging engagement with the tapered inner side surface on the base section. The wedging engagement of the collar section and the base section of the housing facilitates constructing the housing with relatively large tolerances.

The joint assembly may also include a bearing which engages a head end portion of the movable member and the collar section of the housing. A resilient wear compensator is advantageously used to press the bearing against the collar section of the housing.

BRIEF DESCRIPTION OF THE DRAWINGS

The foregoing and other features of the present invention will become apparent to those skilled in the art upon reading the following description of a preferred embodiment of the present invention with reference to the accompanying drawings, in which:

FIG. 1 is a partial section view of an assembled portion of a vehicle steering linkage including a joint assembly constructed in accordance with the present invention; and FIG. 2 is an exploded, pre-assembly view illustrating the component parts of the vehicle steering linkage of FIG. 1.

DESCRIPTION OF A PREFERRED EMBODIMENT

Referring to FIG. 1, the steering linkage of the present invention comprises a ball joint 12. The ball joint 12 comprises a sheet metal socket 14, particularly shown in FIG. 2, and a ball stud 16. The ball stud 16 has a ball end 18 and a threaded end 20 which is connected to a vehicle steering arm (not shown) in a known manner.

The sheet metal socket 14 is stamped from sheet metal. The sheet metal can be any SAE/ASTM grade stamping material which meets strength, ductility, and formability requirements well known in the art. One suitable stamping material is SAE XLF950 supplied by Worthington Steel Company.

The sheet metal socket 14 has a first end portion 24. The first end portion 24 is of known configuration, such as shown in U.S. Pat. No. 5,154,350, and is connected to a tie rod (not shown) of a vehicle steering linkage in a known manner.

The sheet metal socket 14 also has a second end portion 26 (FIG. 2). The second end portion 26 is cup-shaped defining a chamber 28. The chamber 28 has a vertical axis 30. The first end portion 24 of the sheet metal socket 14 extends radially from the chamber 28.

The second end portion 26, in FIG. 2, has an upper cylindrical lip 32. The lip 32 defines an open top 34. Below the lip 32, the second end portion 26 has a conical portion at 38 terminating in base portion 40 integral with the conical portion 38.

The socket 14 is formed from flat sheet metal. The forming steps include cutting, stamping and bending. The latter step forms the first end portion 24 into a quasi-cylindrical member which has a longitudinally running seam 42 along the top of the first end portion. As shown in FIGS. 1 and 2, the seam 42 continues into the second end portion 26 terminating at the top of lip 32 (FIG. 2).

The ball joint 12 also comprises, referring to FIG. 2, a wear tolerance compensator 44, a bearing 46, a metal collar 48, and a boot seal 50. The wear tolerance compensator 44 is a toroidal-shaped member having an axial opening 66. Preferably, the wear tolerance compensator 44 is made of an elastomeric material such as rubber. Alternatively, the wear tolerance compensator can be a toroidal-shaped spring such as shown in U.S. Pat. No. 5,154,530.

As shown in FIG. 1, the wear tolerance compensator 44 seats against the base portion 40 of the socket 14. The bearing 46 seats on top of the wear tolerance compensator 44. As will be described, the bearing 46 compresses the wear tolerance compensator 44 under a predetermined compression loading. The wear tolerance compensator 44 thus biases the bearing 46 in an upward direction along axis 30. This provides a continuous compensation for wear in the component parts of the ball joint 12.

The ball end 18 seats within the bearing 46 as shown in FIG. 1. This provides a connection between the tie rod (not shown) of a vehicle steering assembly, which is connected to the first end portion 24 of the socket 14, and a vehicle steering arm (not shown), which is connected to the ball joint 12. In this way, axial movement of a tie rod causes pivotal movement of a vehicle steering arm in a known manner.

The bearing 46 has a generally spherical configuration, as shown in FIG. 2, comprising an inner surface 54 defining cavity 56. The bearing 46 is truncated at the top defining opening 58. Preferably, the bearing 46 is made of a non-metallic rigid plastic material such as nylon, type 6/6, manufactured by E. I. Dupont de Nemoirs & Company.

In the top portion of the bearing 46, a plurality of spaced-apart slits 60 are provided extending downwardly from opening 58. The slits 60 allow the opening 58 to expand, permitting ingress of the ball end 18 into the bearing cavity 56.

The bearing outer surface 62 is generally concentric with the bearing inner surface 54, except for a thickened annular middle section 70. The middle section 70 terminates in downwardly facing, radially extending shoulder 64. The middle section 70 extends continuously around the outside of the bearing 46 and is cylindrical on the outside.

As shown in FIG. 1, the shoulder 64 provides a flat surface against which the wear tolerance compensator 44 seats. The wear tolerance compensator readily conforms to the configuration of the shoulder 64, as well as the underside of the bearing 46 and inner surface of the chamber 28, as shown in FIG. 1.

The bearing 46 also has, on its underside, a cup-shaped projection 68. The cup-shaped projection 68 seats within the wear tolerance compensator opening 66, and is confined by the wear tolerance compensator 44. The wear tolerance compensator 44 is compressed by the bearing 46, the inner surface of the chamber 28, and the shoulder 64, as shown in FIG. 1.

A lubricant, such as grease, can be contained within the bearing cavity 56 to lubricate the ball end 18 for sliding movement against the bearing inner surface 54. The cup-shaped projection 68 can also serve as a repository for lubricant within the bearing 46.

The metal collar 48, FIG. 2, fits over the outer surface 62 of the bearing 46, as shown in FIG. 1. The metal collar 48 has an upper portion 72. An inner side surface 74 of the upper portion 72 is concave. The metal collar 48 also has a lower portion 76. An inner side surface 77 of the lower portion 76 is cylindrical.

The concave upper portion 72 conforms, when the ball joint is assembled as shown in FIG. 1, to the spherical outer upper surface of the bearing 46, in a close fitting relationship. The cylindrical lower portion 76 conforms to the cylindrical outer surface of the thickened middle section 70 of the bearing, when the ball joint is assembled, also in a close fitting relationship.

In this way, the metal collar 48 functions as a close fitting member which biases the bearing 46 downward within the chamber 28 of the sheet metal socket 14. The metal collar 48 has an annular thickened section 86, FIG. 2, which on its outer surface defines a frustoconical, tapered end 82. The tapered end 82 terminates at its upper edge in an upwardly facing shoulder 80. As shown in FIG. 1, the tapered end 82 seats within and conforms to the conical portion 38 of the socket 14.

The lip 32 of the socket 14 initially, as shown in FIG. 2, extends upwardly defining the cylindrical open top 34. In the process of assembling the component parts as shown in FIG. 1, the lip 32 is crimped inwardly by a suitable metal bending tool so that it extends over the shoulder 80 of the metal collar 48. The bending tool causes the lip 32 to press downwardly on the shoulder 80 and wedge the tapered end 82 of the metal collar 48 into the conical portion 38 of the socket 14, under a predetermined load. The tapered end 82 terminates in a lower edge 84. The metal collar tapered end 82 conforms to and is in a close-fitting wedging engagement with the conical portion 38 of the socket 14. This seals the socket 14 from water and other environmental ingress by way of seam 42.

When assembled as shown in FIG. 1, the lower edge 84 extends below the plane of the bearing shoulder 64 and impinges against the wear tolerance compensator 44. This helps lock the wear tolerance compensator 44 against sliding movement within the socket 14.

Referring to FIG. 2, the boot seal 50 is made of an elastomeric material as is conventional in the art. The boot seal 50 has a generally conventional configuration which includes an opening 88. Opening 88 accommodates the end 20 of the ball stud 18, and is in sealing engagement with end 20, as shown in FIG. 1. The boot seal 50 has a lower rim 90 which engages the upper outer surface 78 of the metal collar 48. The boot seal 50 has a barrel-like shape for snap on of the boot seal onto the metal collar 48.

The thickened portion 86 of the metal collar 48 functions within the socket 14 as a brace which adds increased strength to the socket 14. The bearing 46 and the wear tolerance compensator 44 interface primarily with the collar 48. Wedging engagement of the collar 48 with the socket 14 enables the ball joint 12 to be manufactured with reduced manufacturing tolerances, in turn providing improved cost savings and design flexibility.

As shown in FIG. 1, the lower end of the bearing 46 is gripped by the wear tolerance compensator 44, which in turn is wedged between surfaces of the socket 14, the bearing 46 and the metal collar 48. This stabilizes the bearing 46 within the socket 14.

From the above description of the invention, those skilled in the art will perceive improvements, changes and modifications. Such improvements, changes and modifications within the skill of the art are intended to be covered by the appended claims.

Having described the invention, the following is claimed:

1. A joint assembly comprising:

a movable member having a head end portion and a shank portion which extends outward from said head end portion; and a metal housing which at least partially encloses said head end portion of said movable member, said metal housing including a base section and a collar section which is connected with said base section, said base section of said metal housing having a chamber in which said head end portion of said movable member is at least partially disposed and an opening through which said movable member extends, said chamber having an inner side surface which has a first diameter adjacent the opening and tapers in a direction away from the opening to a second diameter smaller than said first diameter, said collar section having an opening through which said movable member extends and an outer side surface which has a third diameter and tapers in a direction away from the opening in said collar section to a fourth diameter smaller than the third diameter, said third and fourth diameter of said outer side surface on said collar section being disposed in wedging engagement with said first and second diameter of said inner side surface of said chamber.

2. A joint assembly as set forth in claim 1 further including a bearing formed of polymeric material and disposed between said head end portion of said movable member and an inner side surface of said collar section of said metal housing and a resilient wear tolerance compensator disposed between said base section of said metal housing and said bearing to press an outer side surface of said bearing against said inner side surface of said collar section.

3. A joint assembly comprising:

(a) a socket defining a chamber having a base portion and a conical portion which has a first diameter located away from said base portion and tapers toward a second diameter smaller than said first diameter and located adjacent said base portion;

(b) a wear tolerance compensator seated against said socket base portion;

(c) a bearing contained within the socket chamber comprising a bottom end which seats against said wear tolerance compensator; and (d) a stud including a ball end slidably held by said bearing;

(e) an annular collar fitting over the bearing comprising a tapered end seated in said socket conical portion;

said socket having a clamp portion pressing the collar tapered end into sealing engagement with the socket conical portion.

4. The joint assembly of claim 3 wherein said collar is formed of metal material.

5. The joint assembly of claim 3 wherein said socket conical portion and said socket clamp portion comprise contiguous edges defining a seam and the sealing engagement of said collar tapered end with said socket conical portion impedes ingress of contaminants into said socket through said seam.

6. The joint assembly of claim 3 wherein said collar has a thickened annular portion concentric with at least a part of the socket conical portion which functions to strengthen said socket.

7. The joint assembly of claim 3 wherein said wear tolerance compensator is annular in configuration and of an elastomeric material.

8. The joint assembly of claim 3 wherein said bearing is a plastic material comprising one end defining an expandable opening for ingress of said stud ball end into the bearing.

9. The joint assembly of claim 3 wherein said wear tolerance compensator is compressible and said clamp portion is a ring exerting a predetermined load against said collar compressing said wear tolerance compensator.

10. The joint assembly of claim 9 wherein said socket is of a stamped sheet metal material and said clamp portion is a lip of said socket crimped over onto said collar.

11. The joint assembly of claim 10 wherein said collar has an annular flange and said clamp portion impinges against said flange.

12. A joint assembly comprising:
(a) a socket of stamped sheet metal defining a chamber comprising a base portion and a conical portion above said base portion integral with said base portion;
(b) a wear tolerance compensator of an elastomeric material having a circular configuration seated against said socket base portion;
(c) a spherical bearing within the socket chamber of a plastic material comprising a bottom end which seats against said wear tolerance compensator, said wear tolerance compensator being under a compression load by said spherical bearing;
(d) a stud including a ball end slidably held by said bearing;
(e) an annular metal collar fitting over the spherical bearing comprising a tapered end seated in said socket conical portion and a shoulder portion above and integral with said tapered end;
(f) said socket comprising a clamp portion in the form of an annular lip crimped over onto said collar shoulder portion wedging the collar tapered end into said socket conical portion with a predetermined load effective to seal the socket from environmental ingress; and
(g) said metal collar comprising an annular thickened portion concentric with at least part of said socket conical portion to strengthen said socket.

13. The joint assembly of claim 12 wherein said metal collar is in the shape of a coupling ring comprising a concave end opposite said tapered end, said collar shoulder portion being between said concave end and said tapered end, said concave end comprising a concave inner surface conforming to and engaging said spherical bearing and pressing said spherical bearing in compression loading against said wear tolerance compensator.

* * * * *